US006698830B1

(12) United States Patent  
Gaines

(10) Patent No.: US 6,698,830 B1
(45) Date of Patent: Mar. 2, 2004

(54) PORTABLE SEAT AND STORAGE APPARATUS

(76) Inventor: Ronald K. Gaines, 4061 Laguna Ave., Trotwood, OH (US) 45426

( * ) Notice: Subject to any disclaimer, the term of this patent is extended or adjusted under 35 U.S.C. 154(b) by 0 days.

(21) Appl. No.: 10/334,823

(22) Filed: Dec. 31, 2002

(51) Int. Cl.⁷ .................................................. A47C 7/62
(52) U.S. Cl. ................. 297/188.11; 297/380; 297/382; 297/344.18; 297/183.5; 297/452.13
(58) Field of Search .............. 297/382, 452.2, 297/452.13, 188.11, 188.12, 344.18, 129, 380, 440.14, 440.2, 440.22, 440.1, 183.5; 190/8

(56) References Cited

U.S. PATENT DOCUMENTS

| | | | |
|---|---|---|---|
| 4,103,965 A | | 8/1978 | Engman |
| 4,624,502 A | * | 11/1986 | Boole |
| 5,100,203 A | * | 3/1992 | Novak |
| D330,639 S | | 11/1992 | Munro et al. |
| 5,409,291 A | | 4/1995 | Lamb et al. |
| 5,526,537 A | * | 6/1996 | Conrad |
| 5,641,197 A | | 6/1997 | Springmann |
| 5,678,890 A | * | 10/1997 | Tenbroeck |
| 5,911,478 A | * | 6/1999 | Goodman |
| 6,000,752 A | | 12/1999 | Shyr |
| 6,042,180 A | * | 3/2000 | Lombardi |
| D438,719 S | | 3/2001 | Ford, Jr. |
| 6,203,103 B1 | | 3/2001 | Presson |

* cited by examiner

Primary Examiner—Milton Nelson, Jr.
(74) Attorney, Agent, or Firm—Gallagher & Dawsey Co. L.P.A.; Michael J. Gallagher; David J. Dawsey

(57) ABSTRACT

A portable seat and storage apparatus combining the multi-functional capacities of a chair, backpack, and storage device. The device incorporates a frame assembly and back support frame assembly, which cooperate to form an adjustable seating capacity. The apparatus may be a substantially open frame or configured with at least one panel. The seat frame assembly is further configured to define a volume enclosing a storage assembly. The storage assembly may be configured as a single or multicompartmented assembly, and may include a plurality of handles, lids, and drawers. The apparatus may be configured with at least one cooperating storage assembly guide recess and storage guide to guide the storage assembly into proper storage position, as well as a plurality of storage retainers and storage stops to limit the travel of the storage assembly. A plurality of accessory devices may be attached with a plurality of clamp-type accessory holders.

31 Claims, 8 Drawing Sheets

PORTABLE SEAT AND STORAGE APPARATUS

TECHNICAL FIELD

The present invention relates to sporting goods, particularly to a portable seat and storage apparatus suitable for outdoor use.

BACKGROUND OF THE INVENTION

Outdoors enthusiasts must frequently transport their sporting goods, as well as their personal supplies and effects, into the countryside for use. At the desired location, the outdoors person often needs or desires to have more supplies and equipment than can be easily carried using conventional devices. For example, and not by way of limitation, a fishing enthusiast might wish to carry food, drinks, fishing equipment, a chair to sit in, and other various items, to a remote fishing location. It can be significantly cumbersome to carry such a multitude of items as they are conventionally configured. Accordingly, there is a premium on having multifunction devices that can ease the burden of transportation while maintaining the variety of functions available for the user. Additionally, depending on the activity and the rigors of transport, a user may want to use only some parts of a multifunction device, therefore an ideal multifunction device should separate into separate modules that may be used singly, or in combination.

Various attempts have been made to fabricate such multifunction devices, but the essential feature of modularity is generally absent. One example is that of U.S. Pat. No. 6,203,103 to Presson, for a collapsible fishing chair with floats. The '103 device incorporates several devices such as a chair and a storage compartment, but the user would also need to transport possibly unnecessary features, such as the floats, whenever the device is used. Similarly, U.S. Pat. No. 5,409,291 has various features, including soft sided storage compartments, an umbrella holder, and two fishing rod holders, but these components are not generally separable from the device. Some very simple devices, such as that seen in U.S. Pat. No. 6,000,751 to Shyr, or U.S. Pat. No. 4,103,965 to Engman, are configured to have only a dual function, i.e., chair and single storage compartment in the '751 device and chair and tackle box in the '965 device, and therefore lack the versatility of the multifunction instant invention. Other devices, such as the collapsible sports chair of U.S. Pat. No. 5,641,197 to Springmann, which is provided only with a handle and carrying strap, lack the backpack feature of the instant invention, which is important when managing a heavy load over a distance.

Accordingly, the art has needed a means for improving the art of multifunction seating devices. While some of the prior art devices attempted to improve the state of the art of multifunction seating devices, none has achieved the unique and novel configurations and capabilities of the present invention. With these capabilities taken into consideration, the instant invention addresses many of the shortcomings of the prior art and offers significant benefits heretofore unavailable. Further, none of the above inventions and patents, taken either singly or in combination, is seen to describe the instant invention as claimed.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. An object of this invention is to provide outdoor enthusiasts with a convenient method of carrying a multitude of items with them on their adventures. Another object of this invention is to provide a comfortable and easy to carry seat that is suitable for a wide range of endeavors.

In its simplest embodiment, the apparatus is an open frame structure providing a seat with an adjustable back, a variety of possible types of and configurations for storage, and a system for attaching a multitude of possible accessories.

The overall construction of the apparatus is intended to be light and portable, therefore an open construction is generally intended, with possible frame fabrication materials, by way of example and not limitation, including such materials as hollow metal or plastic tubing. The central portion of the seat frame assembly is formed of an open frame seat frame perimeter structure and a storage frame perimeter structure, separated by vertical separation devices, which may be variable in length.

While the seat frame assembly may have a completely open structure, panels and mesh netting may also be used to enclose parts of the frame. A vertical panel may be attached to at least one portion of the seat frame assembly. The seat frame assembly may further be fitted with a storage frame panel attached to at least one portion of the seat frame assembly, and this panel may have one, or many, perforations, to prevent water accumulation on a horizontal surface.

Additionally, the legs of the apparatus may be adjustable in height and be formed with surface pads designed to stabilize the apparatus on soft ground. Further, the legs may be configured to hinge toward the storage frame perimeter structure to permit easy transportation of the apparatus.

While the seat back rotates away from the seat to form a more comfortable seating position, the seat back is also limited in rotation and adjustable to a wide variety of seating positions. This is accomplished most easily with an adjustable strap that connects the seat back to a portion of the seat frame assembly. Alternative methods of adjustably limiting the position of the seat back include locking hinge systems and ratcheting type connections.

Many of the variety of functions of the apparatus center about the storage assembly. The storage assembly may be a single or a multicompartment assembly, and may include a plurality of handles, compartment segments, lids, and drawers. The outdoor enthusiast can use the varying capacities of the storage assembly, by way of example and not limitation, to carry gear such as fishing tackle, transport food or drinks, or even to carry fish or small game, home from the hunt.

The storage assembly may be provided with at least one storage guide recess, which, along with cooperating structures on the seat assembly, can act as a guide to reliably guide the storage assembly into a storage position. The apparatus may further include a plurality of storage stops and storage retainers formed to limit the travel and secure the storage assembly on the storage guide.

The seat material is intended to be resilient and comfortable for sitting, and as such, by way of example and not limitation, fabrication materials such as plastic or canvas are envisioned. The seat may be formed as a single piece stretched between the seat back and seat frame, or may be made in segments that are attached to various parts of the framework. When the seat back is folded over onto the seat for carrying, an aperture in the seat and the back may allow handles from the storage assembly to extend through the apertures for convenient transport of the entire apparatus.

The apparatus may be configured with a wide variety of accessory features. These may include features such as measurement indicia, a carrying strap, and a system of interchangeable accessories based on a universal accessory attachment system. The system utilizes clamping type devices with universal attachment points, such that a wide variety of accessories may be attached to the apparatus. These accessories may include, by way of example and not limitation, fishing rod holders, cup holders, arm rests, storage pockets, umbrella attachments, fishing pole transport attachments, and many others, as will be obvious to one skilled in the art. The apparatus confers a highly desirable quality of modularity. For example, the apparatus may be used without any of, or with any combination of, the above mentioned accessories. Additionally, by way of example and not limitation, the device may be used with or without the storage assembly, which in turn, may be utilized alternately in a one compartment or multicompartment embodiment. In short, the outdoor enthusiast is able to select only those elements and accessories which serve the particular needs of an expedition, and may leave the other components at home.

The instant invention enables a significant advance in the state of the art. The preferred embodiments of the apparatus accomplish this by new and novel arrangements of elements that are configured in unique and novel ways and which demonstrate previously unavailable but preferred and desirable capabilities.

It is to be understood, however, that the same or equivalent functions and features may be accomplished by different embodiments that are also intended to be encompassed within the spirit and scope of the invention.

BRIEF DESCRIPTION OF THE DRAWINGS

Without limiting the scope of the present invention as claimed below and referring now to the drawings and figures:

DETAILED DESCRIPTION OF THE INVENTION

Figure 1:
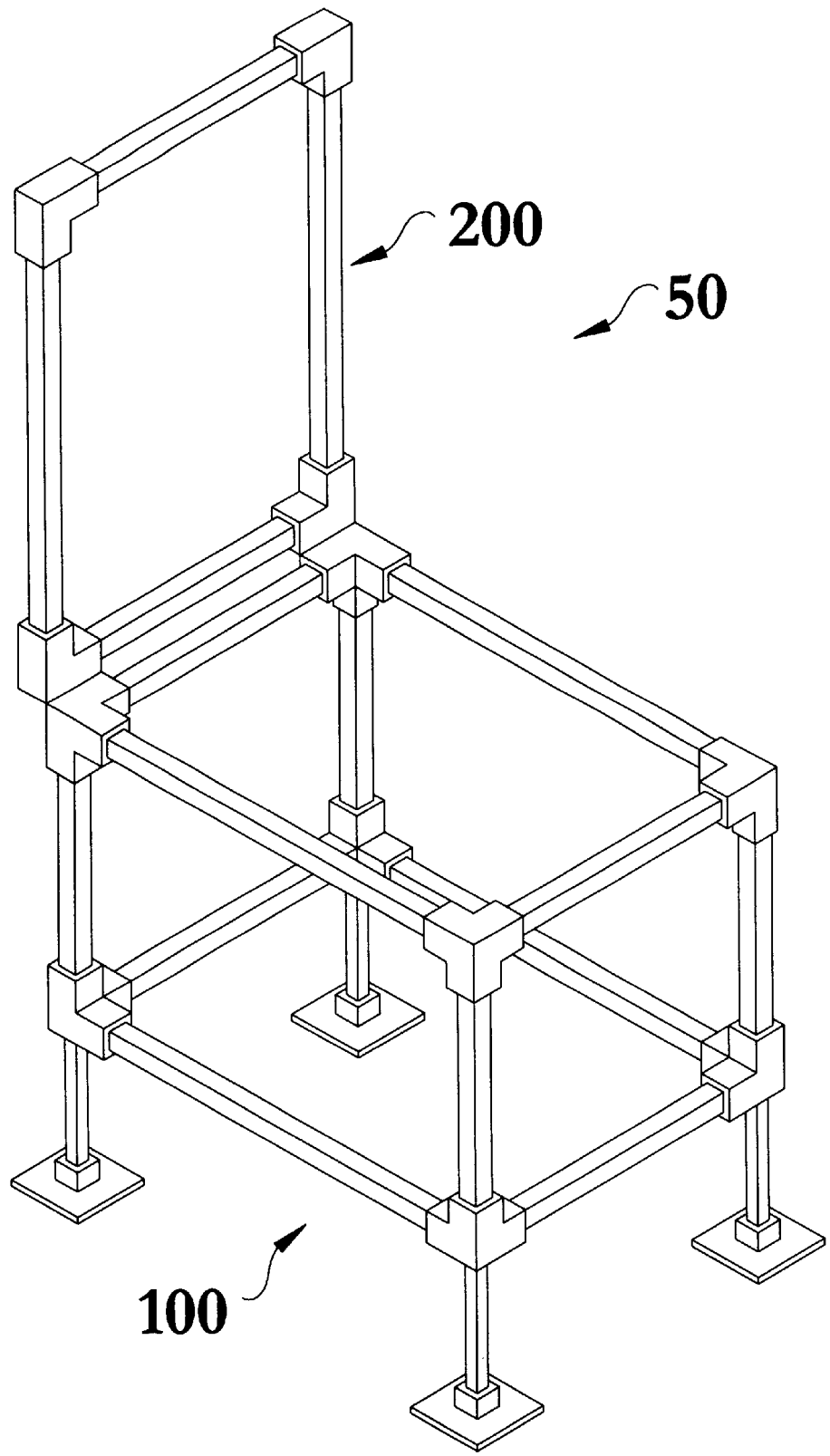
FIG. 1 shows the apparatus in elevated perspective view, in reduced scale.
Figure 2:
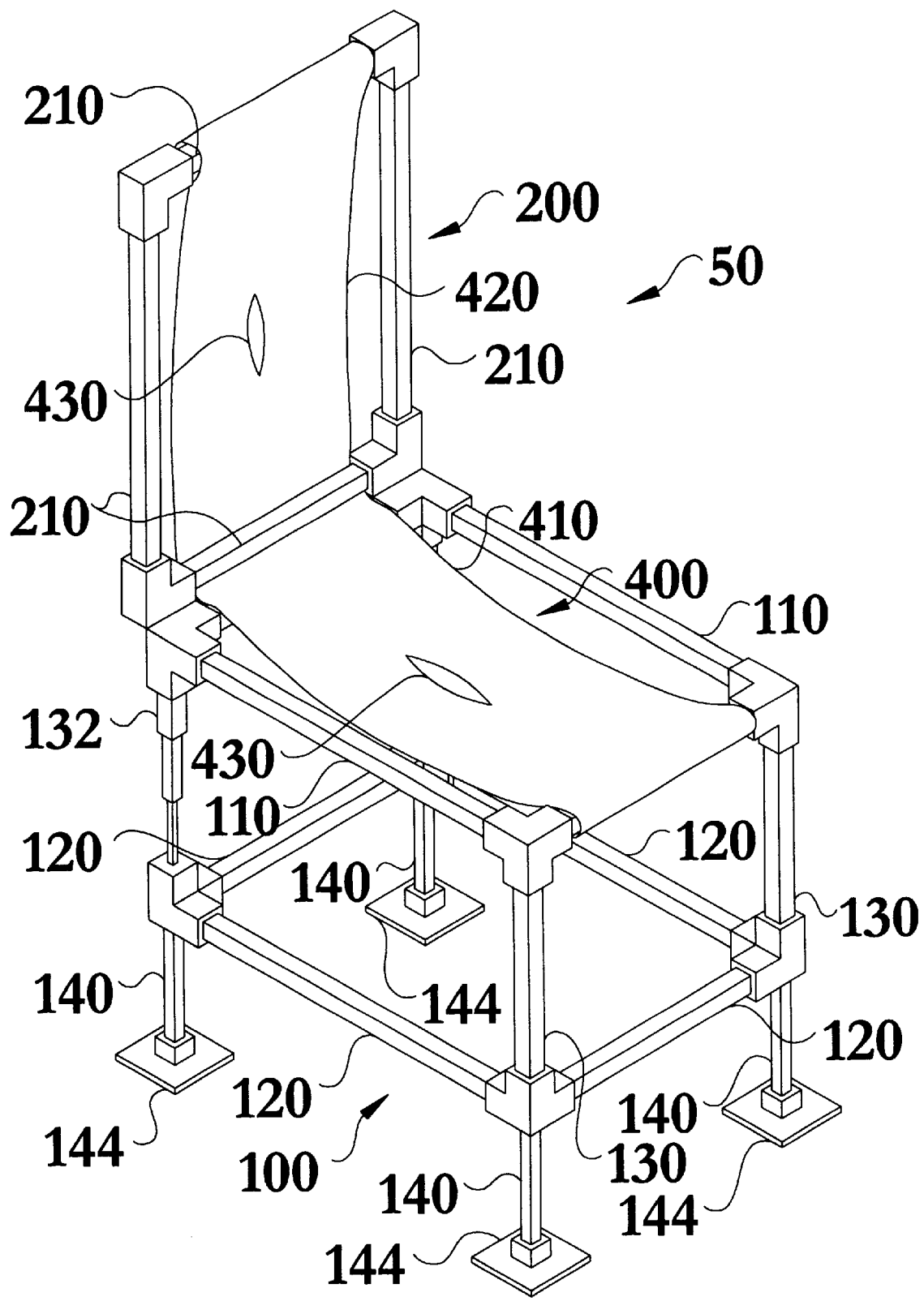
FIG. 2 shows a variation of the apparatus of FIG. 1 in elevated perspective view, in reduced scale.
Figure 3:
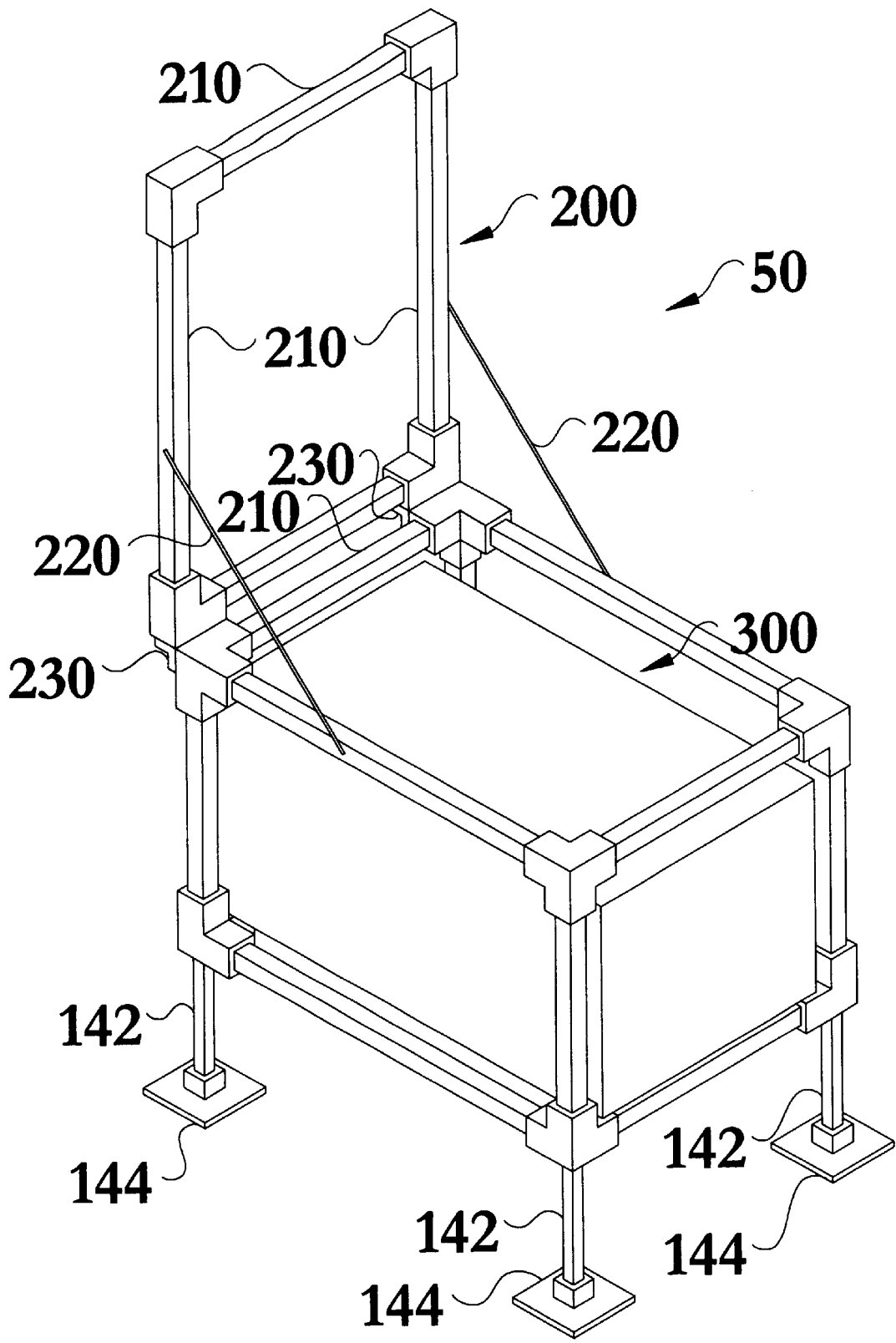
FIG. 3 shows a variation of the apparatus of FIG. 1 in elevated perspective view, in reduced scale.

The portable seat and storage apparatus of the instant invention enables a significant advance in the state of the art. The preferred embodiments of the apparatus accomplish this by new and novel arrangements of elements that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention. In the simplest embodiment, the apparatus 50 includes a seat frame assembly 100, and a back support frame assembly 200, as seen in FIG. 1; a storage assembly 300, a support assembly 400, and at least one adjustable incline limiter 220, as seen in FIGS. 2 and 3. The apparatus 50 may be fabricated from a wide variety of materials, such as plastic, metals, and composites. Additionally, the apparatus 50 may be fabricated so that the seat frame assembly 100 and back support frame assembly 200 have components with profiles that are round, square, rectangular, or any other geometric shape. The seat frame assembly 100 and back support frame assembly 200 may be fabricated from a plurality of subassemblies that are joined at intersections by such methods, by way of example and not limitation, as welding, brazing, any other fusion process, or through the use of mechanical joiners. Additionally, the seat frame assembly 100 and back support frame assembly 200 may be each formed using one or more continuous structural elements that are bent or otherwise formed to have the desired structural shape.

Figure 6:
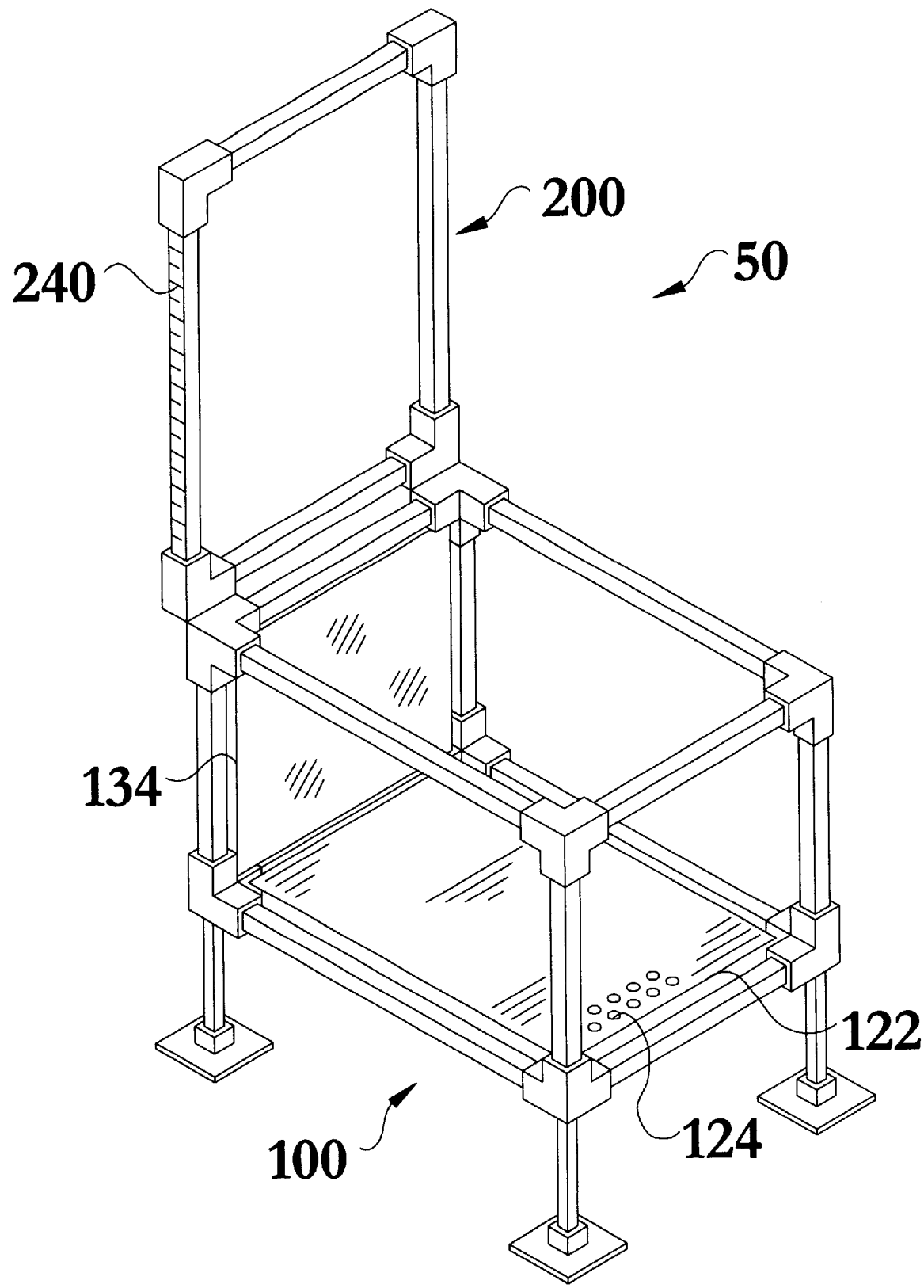
FIG. 6 shows a variation of the apparatus of FIG. 1 in elevated perspective view, in reduced scale.

Referring now to FIGS. 1 and 2, the seat frame assembly 100 is formed to have a plurality of perimeter structures including at least a seat frame perimeter structure 110 and a storage frame perimeter structure 120, and a plurality of vertical separation devices 130, which may be variable in length, as illustrated by an adjustable vertical device 132, interposed between the seat frame perimeter structure 110 and the storage frame perimeter structure 120. At least one vertical panel 134, as seen in FIG. 6 may be attached to at least one portion of the seat frame assembly 100. The vertical panels 134 may further include such features as snaps, straps, and hook and eye type closures to assist in retaining the storage assembly 300 to the apparatus 50.

Referring still to FIG. 6, the seat frame assembly 100 may further be fitted with a storage frame panel 122 attached to at least one portion of the seat frame assembly 100, and the storage frame panel 122 may include at least one perforation 124. Alternatively, mesh netting may be used to enclose parts of the apparatus and create numerous storage compartments and pockets. Additionally, referring again to FIGS. 2 and 3, the apparatus 50 may have a plurality of apparatus elevation extensions 140, which may be formed with surface pads 144, attached to the storage frame perimeter structure 120. The surface pads 144, may be pivotably and releasably attached; may be round, square, or of any other shape; and may include a textured surface for additional grip. Such a textured surface may include, by way of example and not limitation, a plurality of suction cup grips for use on slick surfaces. The plurality of apparatus elevation extensions 140 may be designed to hinge or retract into the plurality of vertical separation devices 130 to reduce the size of the apparatus 50 during transport.

Figure 4:
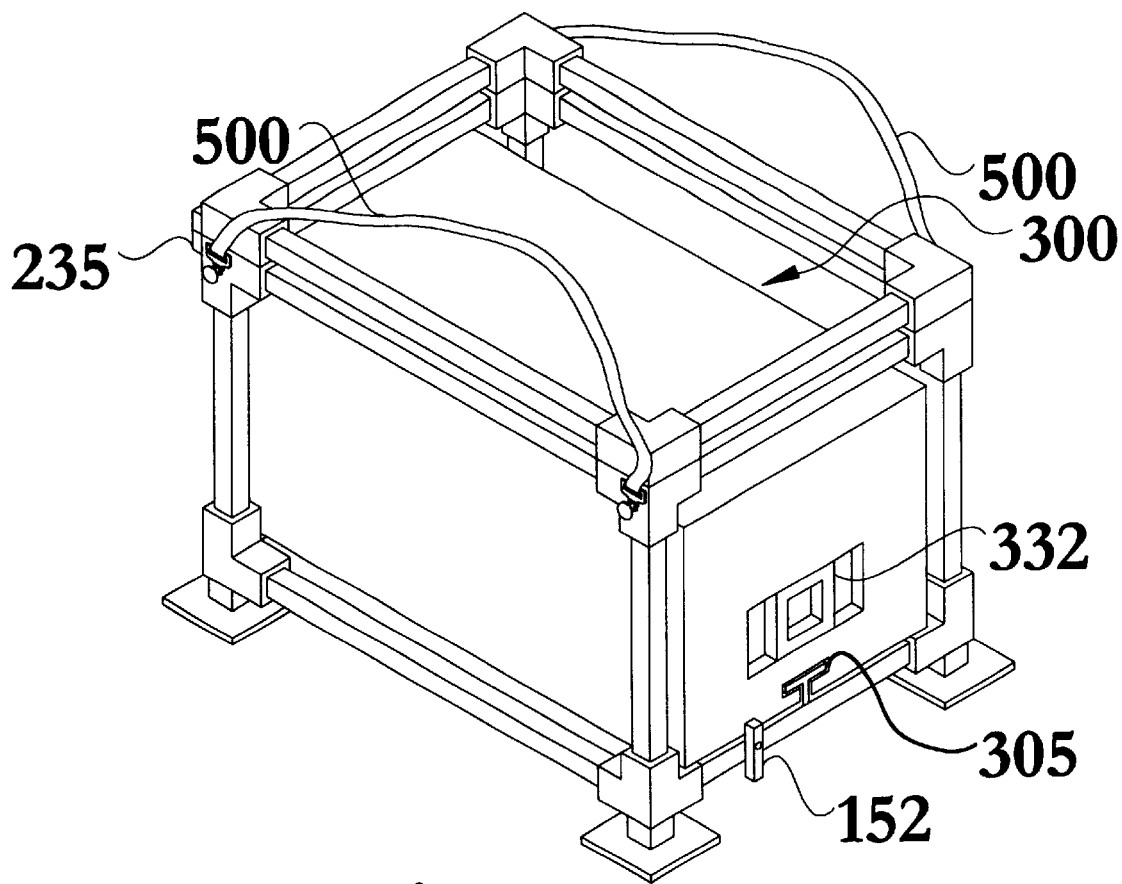
FIG. 4 shows a variation of the apparatus of FIG. 3 in a fully collapsed position, in elevated perspective view, in reduced scale.

The back support frame assembly 200 is formed to have at least one back frame perimeter structure 210 rotatably attached to the seat frame assembly 100 by a rotational attachment device 230, shown in FIG. 3, which, in the preferred embodiment, may be a hinge 235, as illustrated in FIG. 4. However, the rotational attachment device 230 may be formed via cooperating sections of the back frame perimeter structure 210 and the seat frame assembly 100.

Referring now to FIGS. 3, 4, 5, 8 and 9, the storage assembly 300 may be formed with at least one compartment. In one embodiment shown in FIG. 5, the storage assembly 300 includes a primary compartment 320 and a secondary compartment 330. The primary compartment 320 may include a top surface 321, a bottom surface 323, and at least one sidewall 325. Additionally, the support assembly 400 may be formed to secure to at least a portion of the seat frame perimeter structure 110 and secure to a portion of the back frame perimeter structure 210, as shown in FIG. 2. The at least one compartment 320, 330 of the storage assembly 300 further includes at least one carrying handle 322, 332.

Figure 5:
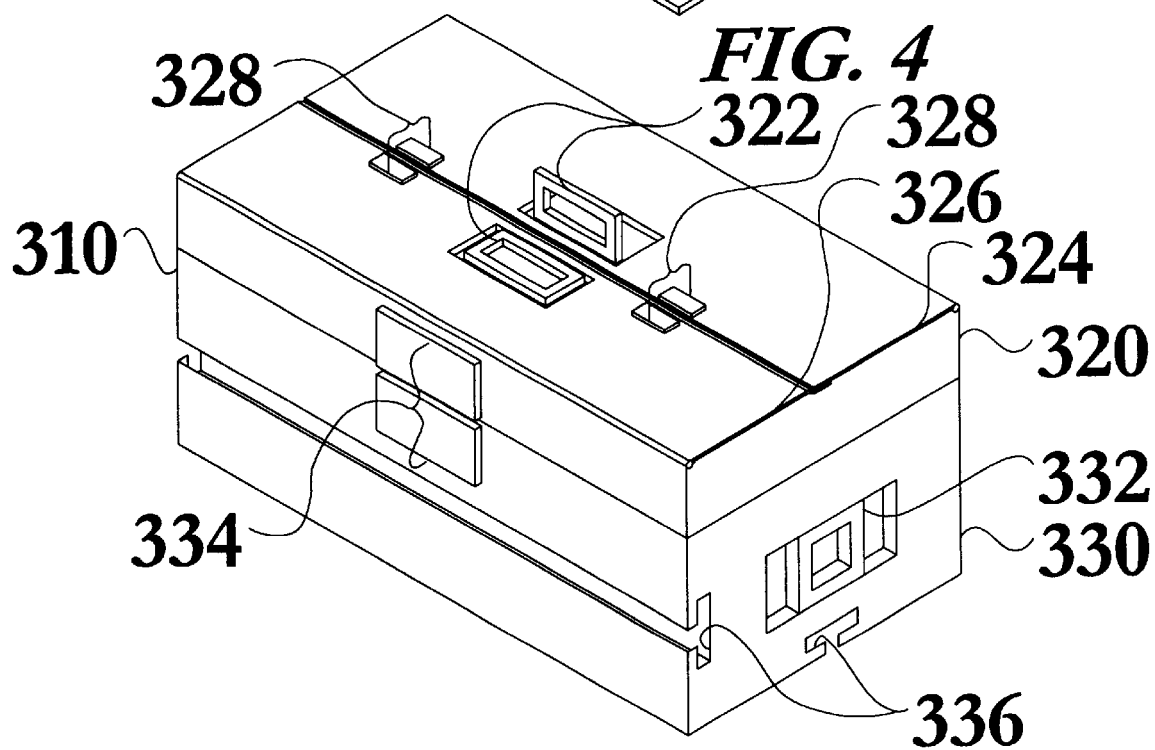
FIG. 5 shows a variation of the storage assembly of FIG. 4 in elevated perspective view, in reduced scale.
Figure 8:
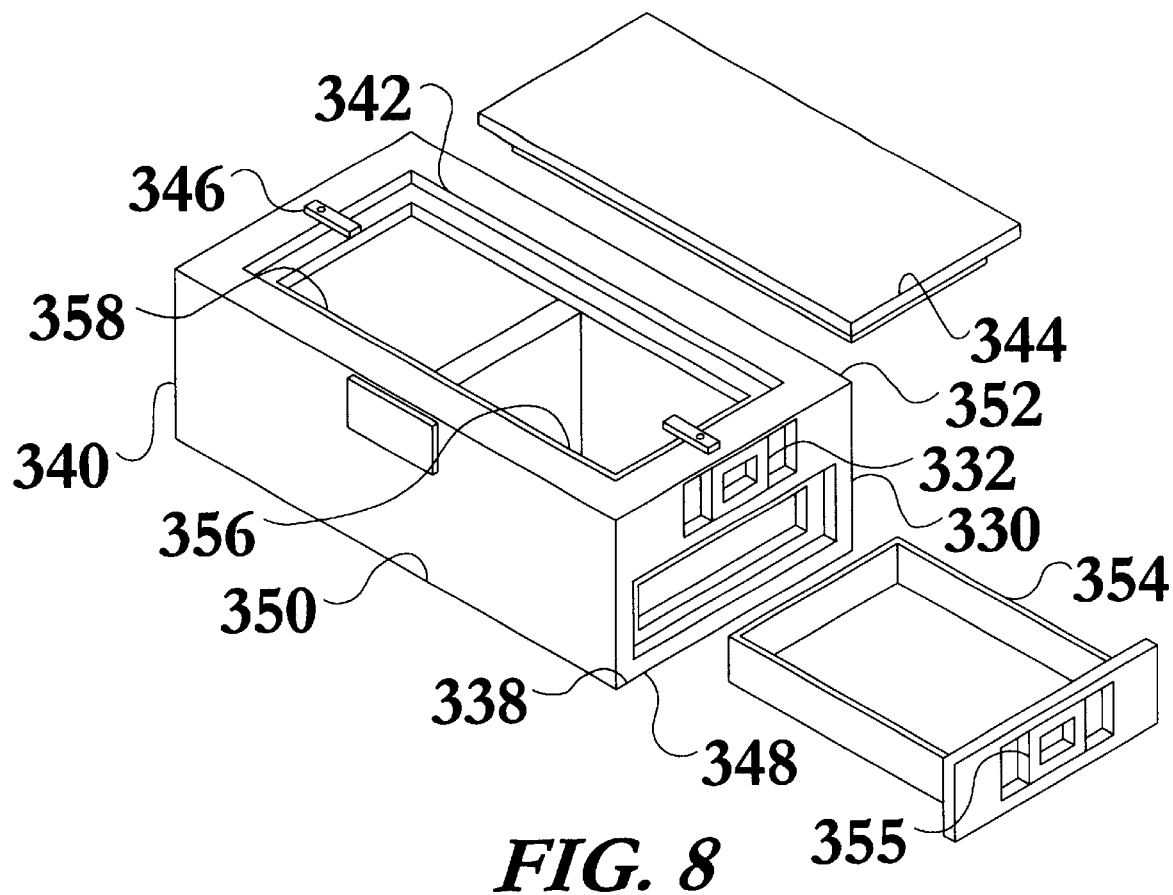
FIG. 8 shows a variation of the secondary compartment of the storage assembly of FIG. 4, in elevated perspective view, in reduced scale.
Figure 9:
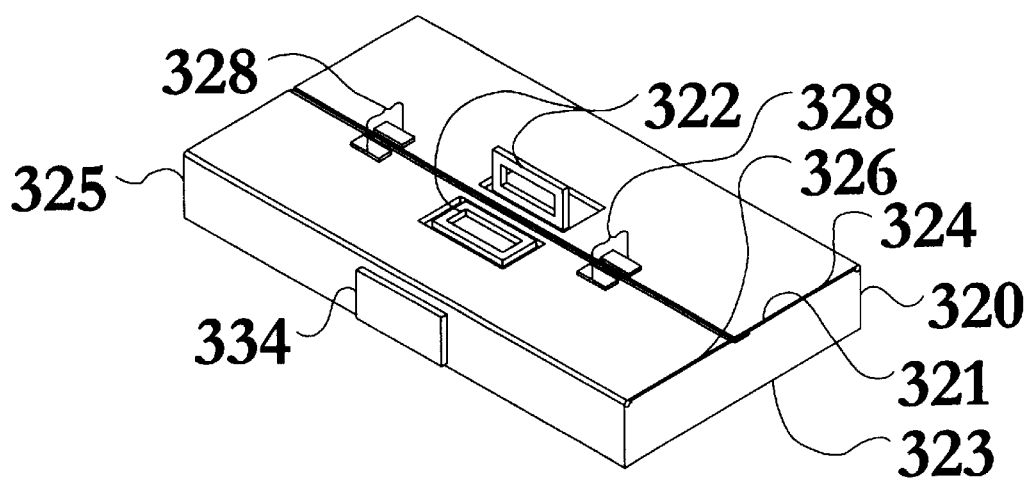
FIG. 9 shows a variation of the primary compartment of the storage assembly of FIG. 4 in elevated perspective view, in reduced scale.

As seen in FIG. 5, in one particular embodiment the primary compartment 320 may include at least one primary compartment handle 322, a first rotating lid 324, a second rotating lid 326, and at least one lid interconnecting device 328. Referring now to FIGS. 4 and 5, the storage assembly 300 may be configured as a multicompartment and multiuse assembly, wherein the storage assembly 300 further comprises a multicompartment storage device 310 having a plurality of compartments, including at least the primary compartment 320 and a secondary compartment 330, as shown in FIG. 8. The secondary compartment 330 may have a plurality of surfaces including at least a top surface 342, formed with a secondary compartment lid 344 and at least one secondary compartment lid retainer 346, a bottom surface 348, a front surface 338, a rear surface 340, a left surface 350, and a right surface 352. The secondary compartment 330 may further include, as seen in FIG. 5, at least one secondary compartment handle 332 to facilitate the easy sliding of the compartment 330 into and out of the apparatus 50, at least one compartment interconnecting device 334, and at least one secondary compartment guide recess 336. As seen in FIG. 8, the secondary compartment 330 may further include a secondary compartment drawer 354 with a drawer handle 355, and a plurality of chambers 356, 358. The secondary compartment drawer 354 may be configured to store cans, or bottles, of beverages or common fishing bait containers. Among many other variations, the secondary chamber 358, may be configured as a bait storage compartment.

Figure 7:
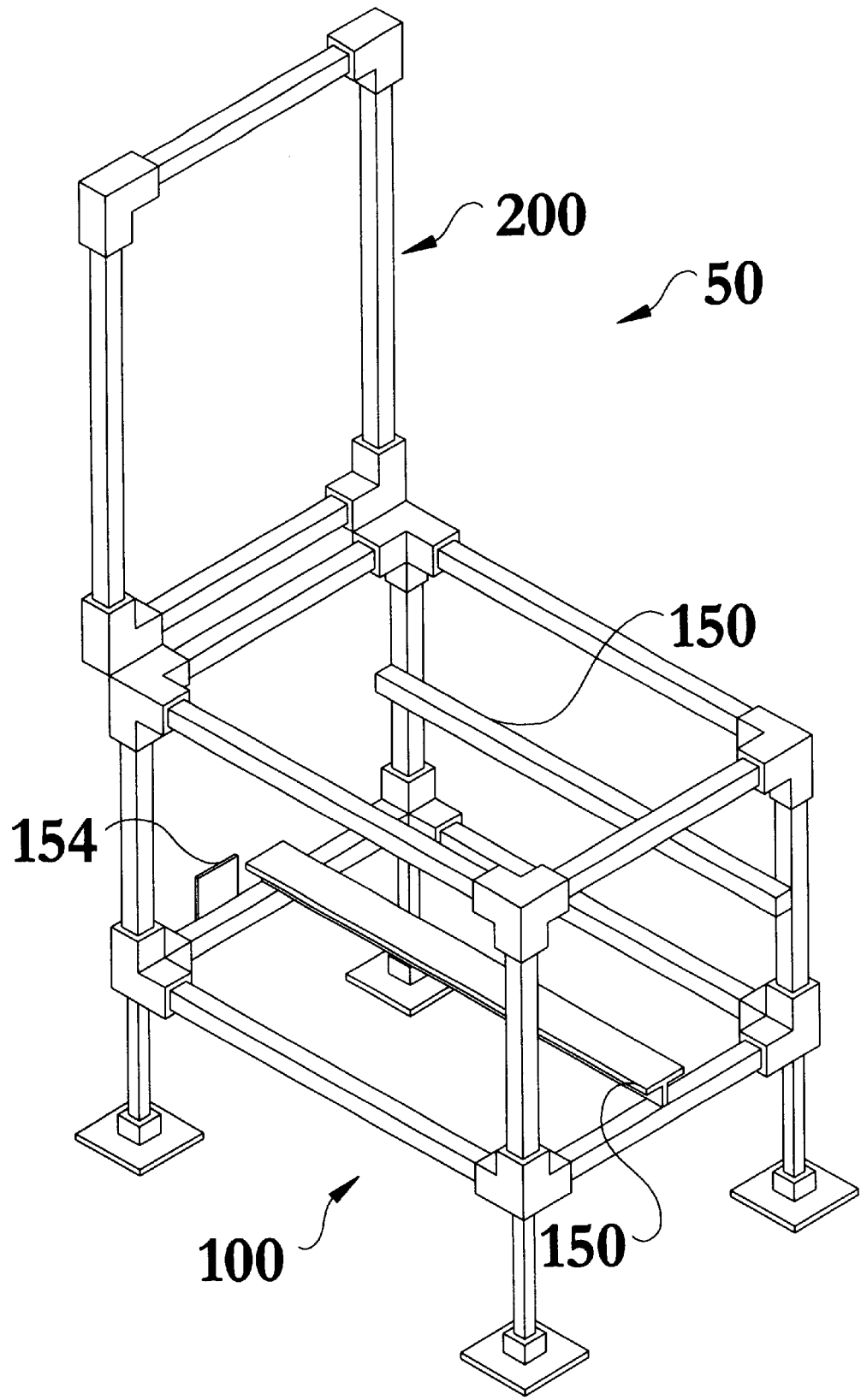
FIG. 7 shows a variation of the apparatus of FIG. 1 in elevated perspective view, in reduced scale.

Referring now to FIGS. 4 and 5, the storage assembly 300 may be provided with at least one storage guide recess 336, formed to cooperate with a storage guide 305 to releasably guide the storage assembly 300 into a volume, seen in FIGS. 2 and 3, bounded by the seat frame perimeter structure 110, the storage frame perimeter structure 120, and the vertical separation devices 130. The apparatus 50 may further include a plurality of storage stops 154 and storage retainers 152, seen in FIG. 4 and 7, formed to limit the travel of the storage assembly 300 on the at least one storage guide 150 and secure the storage assembly 300 in the apparatus 50 during transport. Additionally, the storage assembly 300 may be insulated, vacuum sealed, or incorporate other technologies to allow use of the storage assembly 300, or a part thereof, as a cooler or refrigerator.

Referring now to FIGS. 1 through 3, in one embodiment, the at least one adjustable incline limiter 220 may be formed to adjustably connect at least one portion of the back support frame assembly 200 to at least one portion of the seat frame assembly 100. The at least one adjustable incline limiter 220 may be an adjustable strap connecting the at least one portion of the seat frame assembly 100 and at least one portion of the back frame perimeter structure 210.

The support assembly 400 may be configured as a single piece, or may be formed from a plurality of sections, including at least a base support section 410 and a back support section 420.

The support assembly 400 may further include at least one primary handle slot 430 formed to receive the at least one primary compartment handle 322. The support assembly 400 may be configured and attached to the apparatus 50 in any one of many possible configurations, as would be obvious to one skilled in the art. The support assembly 400 may, by way of example and not limitation, be constructed of a single flexible piece that may be attached to the back support frame assembly 200 and the seat frame assembly 100, or it may be configured of multiple pieces that are affixed to various portions of the apparatus 50. In particular, by way of example and not limitation, the support assembly 400 may be made of two pieces of flexible material, one spanning any two sides of the back frame perimeter structure 210, and one spanning any two sides of the seat frame perimeter structure 110. The support assembly 400 may be made of solid or multipiece flexible material, and may be padded or inflatable for additional comfort, and to provide buoyancy to the apparatus 50. The support assembly 400 may be attached to the apparatus 50 by means of folded over and sewn seams, snaps, or hook and eye type closure material, as would be apparent to one skilled in the art. Additionally, the support assembly 400 may include a plurality of pockets adapted to hold various items. The plurality of pockets may be liquid tight to hold valuables, or may be of a breathable or transparent construction when so desirable.

Figure 10:
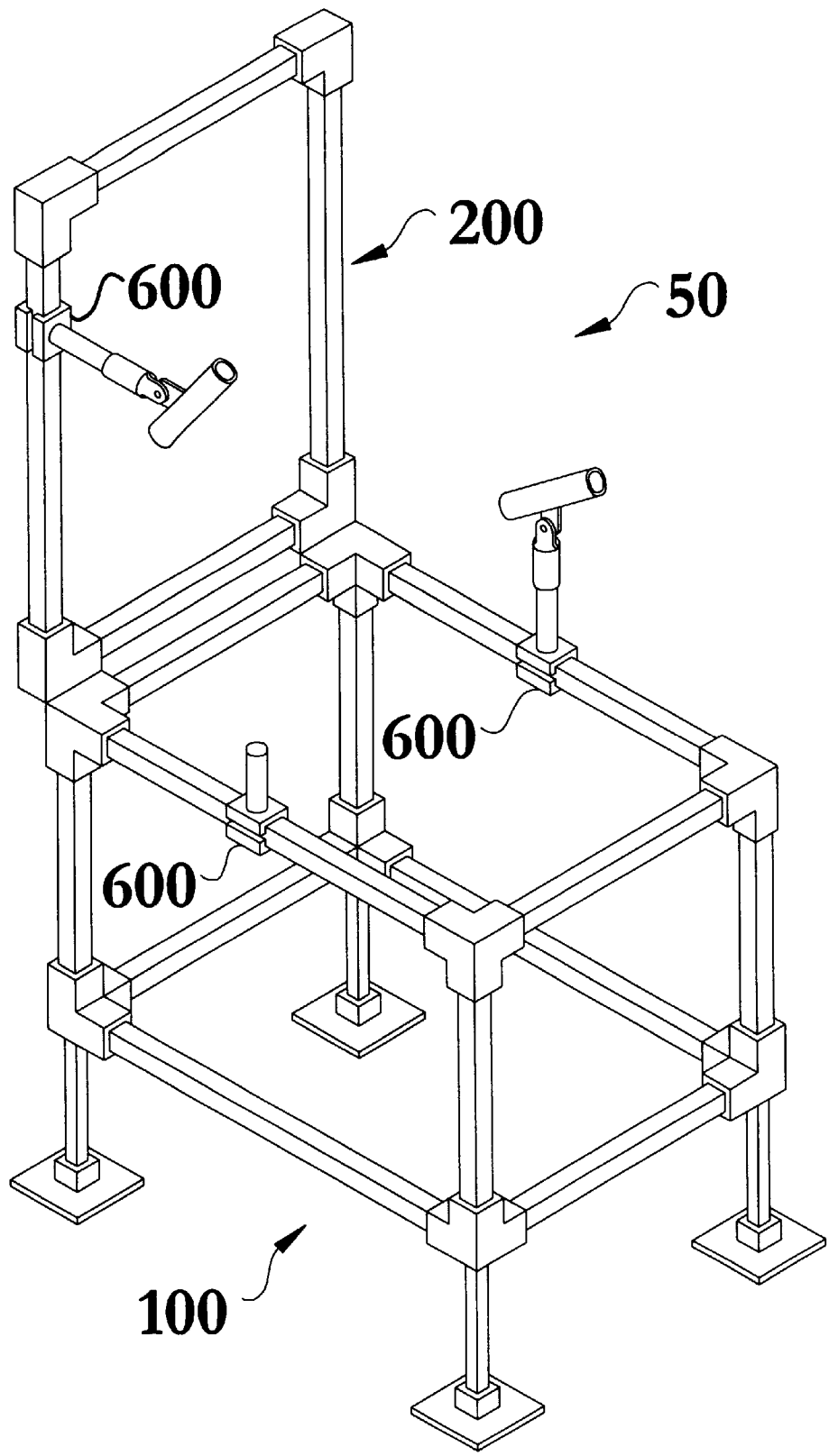
FIG. 10 shows a variation of the apparatus of FIG. 1 in elevated perspective view, in reduced scale.

The apparatus may be configured with a wide variety of accessory features. These may include features such as measurement indicia 240, seen in FIG. 6, or a system of interchangeable accessories based on a universal accessory attachment system. These accessories attach to the apparatus 50 via a friction fit universal clamp 600, as shown in FIG. 10. These accessories may include, by way of example and not limitation, fishing rod holders, cup holders, arm rests, storage pockets, umbrella attachments, fishing pole transport attachments, lantern holders, and many others, as will be obvious to one skilled in the art.

Overall, the apparatus 50 may be configured with a variety of convenience features. These may include, by way of example and not limitation, at least one detachable carry strap 500, as seen in FIG. 4. The attachment of multiple carry straps 500 may give the apparatus a backpackable function. Alternatively, a single detachable carry strap 500 may facilitate carrying the apparatus 50 from a single shoulder.

These variations, modifications, alternatives, and alterations of the various preferred embodiments, arrangements, and configurations may be used alone or in combination with one another as will become more readily apparent to those with skill in the art with reference to the following detailed description of the preferred embodiments and the accompanying figures and drawings.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

I claim:

1. A portable seat and storage apparatus, comprising;
   a seat frame assembly, a back support frame assembly, a storage assembly, a support assembly, and at least one adjustable incline limiter, wherein,
   the seat frame assembly is formed to have a plurality of perimeter structures including at least a seat frame perimeter structure and a storage frame perimeter structure, a plurality of vertical separation devices interposed between the seat frame perimeter structure and the storage frame perimeter structure, a plurality of apparatus elevation extensions attached to the storage frame perimeter structure, and wherein the back support frame assembly is formed to have at least one back frame perimeter structure rotatably attached to the seat frame assembly by at least one rotational attachment device;
   the storage assembly is formed with at least one compartment having a top and a bottom surface and at least one sidewall;
   the support assembly is formed to secure to at least a portion of the seat frame perimeter structure and secure to a portion of the back frame perimeter structure; and
   the at least one adjustable incline limiter is formed to adjustably connect at least one portion of the back support frame assembly to at least one portion of the seat frame assembly.

2. The apparatus of claim 1, wherein the seat frame assembly includes a storage frame panel attached to at least one of the seat frame assembly perimeter structures.

3. The apparatus of claim 2, wherein the storage frame panel includes at least one perforation.

4. The apparatus of claim 1, wherein the plurality of vertical separation devices are adjustable in length.

5. The apparatus of claim 1, wherein a vertical panel is attached to at least one portion of the seat frame assembly.

6. The apparatus of claim 1, further including at least one storage guide formed to cooperate with a storage guide recess formed in the storage assembly to releasably guide the storage assembly into a volume bounded by the seat frame perimeter structure, the storage frame perimeter structure, and the plurality of vertical separation devices, and a plurality of storage stops and storage retainers formed to limit the travel of the storage assembly on the at least one storage guide and releasably secure the storage assembly to the apparatus during transport.

7. The apparatus of claim 1, wherein the at least one adjustable incline limiter is an adjustable strap connecting a portion of the seat frame assembly and a portion of the back frame perimeter structure.

8. The apparatus of claim 1, further including measurement indicia.

9. The apparatus of claim 1, wherein the at least one compartment of the storage assembly includes at least one carrying handle on the top surface of the at least one compartment.

10. The apparatus of claim 1, wherein the storage assembly is a multicompartment storage device having a plurality of compartments including at least a primary compartment having at least a top surface, a bottom surface, at least one sidewall, and a secondary compartment having at least a top surface formed with a secondary compartment lid and at least one secondary compartment lid retainer, a bottom surface, a front surface, a rear surface, a left surface, and a right surface.

11. The apparatus of claim 10, further including at least one primary compartment handle, a first rotating lid, a second rotating lid, and at least one lid interconnecting device.

12. The apparatus of claim 11, wherein the support assembly further includes at least one primary handle slot formed to receive the at least one primary compartment handle.

13. The apparatus of claim 10, wherein the secondary compartment further includes a secondary compartment drawer.

14. The apparatus of claim 10, wherein the secondary compartment further includes a plurality of chambers.

15. The apparatus of claim 14, wherein one of the plurality of chambers is a bait storage compartment.

16. The apparatus of claim 10, further including at least one secondary compartment handle, at least one compartment interconnecting device, and at least one secondary compartment guide recess.

17. The apparatus of claim 1, wherein the support assembly further includes a plurality of sections, including at least a base support section and a back support section.

18. The apparatus of claim 1, further including at least one detachable carry strap.

19. The apparatus of claim 1, wherein the rotational attachment device is a hinge.

20. The apparatus of claim 1, further including a plurality of surface pads adapted to releasably connect to the plurality of apparatus elevation extensions.

21. The apparatus of claim 1, fiber including at least one accessory clamp, formed to releasably clamp onto the apparatus, having a common attachment fitting adapted to attach to a plurality of accessories.

22. The apparatus of claim 21, wherein one of the plurality of accessories is a fishing rod holder.

23. A portable seat and storage apparatus, comprising;
   a seat frame assembly, a back support frame assembly, a storage assembly, a support assembly, and at least one adjustable incline limiter, wherein,
   the seat frame assembly is formed to have a plurality of perimeter structures including at least a seat frame perimeter structure and a storage &me perimeter structure, a plurality of adjustable vertical separation devices interposed between the seat frame perimeter structure and the storage frame perimeter structure, a plurality of apparatus elevation extensions attached to the storage frame perimeter structure and releasably connected to a plurality of surface pads, a back support frame assembly formed to have at least one back frame perimeter structure rotatably attached to the seat frame assembly by at least one rotational attachment device, a storage frame panel attached to at least one of the seat frame assembly perimeter structures, and a vertical panel attached to at least one portion of the seat frame assembly;
   the storage assembly is formed with at least one compartment having a top and a bottom surface, at least one sidewall, and at least one carrying handle on the top surface;
   the support assembly is formed to secure to at least a portion of the seat frame perimeter structure and secure to a portion of the back frame perimeter structure;

the at least one adjustable incline limiter is an adjustable strap connecting a portion of the seat frame assembly and a portion of the back frame perimeter structure;

at least one storage guide is formed to cooperate with a storage guide recess formed in the storage assembly to releasably guide the storage assembly into a volume bounded by the seat frame perimeter structure, the storage frame perimeter structure, and the plurality of vertical separation devices, and including a plurality of storage stops and storage retainers formed to limit the travel of the storage assembly on the at least one storage guide and releasably secure the storage assembly to the apparatus during transport; and at least one carry strap is detachably secured to the apparatus to aid in transport.

24. The apparatus of claim 23, wherein the storage assembly is a multicompartment storage device having a plurality of compartments, including at least a primary compartment including at least a top surface, a bottom surface, and at least one sidewall, and a secondary compartment including at least a top surface formed with a secondary compartment lid and at least one secondary compartment lid retainer, a bottom surface, a front surface, a rear surface, a left surface, and a right surface.

25. The apparatus of claim 24, wherein the secondary compartment further includes a plurality of chambers.

26. The apparatus of claim 24, wherein the secondary compartment further includes a secondary compartment drawer.

27. The apparatus of claim 24, further including at least one primary compartment handle, a first rotating lid, a second rotating lid, at least one lid interconnecting device, at least one secondary compartment handle, at least one compartment interconnecting device, and at least one secondary compartment guide recess.

28. The apparatus of claim 25, wherein the support assembly further includes a plurality of sections, including at least a base support section, formed to include at least one primary handle slot formed to receive the at least one primary compartment handle, and a back support section, formed to include at least one primary handle slot formed to receive the at least one primary compartment handle.

29. The apparatus of claim 23, wherein the rotational attachment device is a hinge.

30. The apparatus of claim 23, further including at least one accessory clamp, formed to releasably clamp onto the apparatus, having a common attachment fitting adapted to attach to a plurality of accessories.

31. A portable seat and storage apparatus, comprising;

a seat frame assembly, a back support frame assembly, a storage assembly, a support assembly, and at least one adjustable incline limiter, wherein, the seat frame assembly is formed to have a plurality of perimeter structures including at least a seat fame perimeter structure and a storage frame perimeter structure, a plurality of adjustable vertical separation devices interposed between the seat frame perimeter structure and the storage frame perimeter structure, a plurality of apparatus elevation extensions attached to the storage frame perimeter structure and releasably connected to a plurality of surface pads, a back support frame assembly formed to have at least one back frame perimeter structure rotatably attached to the seat frame assembly by at least one hinge, a storage frame panel attached to at least one of the seat frame assembly perimeter structures, a vertical panel attached to at least one portion of the seat frame assembly, at least one storage guide formed to cooperate with a storage guide recess formed in the storage assembly to releasably guide the storage assembly into a volume bounded by the seat frame perimeter structure, the storage frame perimeter structure, and the plurality of vertical separation devices, and a plurality of storage stops and storage retainers formed to limit the travel of the storage assembly on the at least one storage guide and releasably secure the storage assembly to the apparatus during transport, and having at least one detachable carry strap;

the storage assembly is a multicompartment storage device having at least a primary compartment, at least a top surface and a bottom surface, at least one sidewall, at least one primary compartment handle, a first rotating lid, a second rotating lid, and at least one lid interconnecting device, and a secondary compartment having at least a top surface formed with a secondary compartment lid, at least one secondary compartment lid retainer, a bottom surface, a front surface, a rear surface, a left surface, a right surface, at least one secondary compartment handle, at least one compartment interconnecting device, at least one secondary compartment guide recess, and a secondary compartment drawer, and further including at least one accessory clamp, formed to releasably clamp onto the apparatus, and further formed with a common attachment fitting adapted to attach to a plurality of accessories;

the support assembly, having a plurality of sections, includes at least a base support section and a back support section, each of the plurality of sections formed with at least one primary handle slot to receive the at least one primary compartment handle; and the at least one adjustable incline limiter is an adjustable strap connecting the a portion of the seat frame assembly and a portion of the back frame perimeter structure.

* * * * *